US009996489B2

(12) United States Patent
Shachar et al.

(10) Patent No.: US 9,996,489 B2
(45) Date of Patent: Jun. 12, 2018

(54) MEMORY AGGREGATION DEVICE

(71) Applicant: Huawei Technologies Co., Ltd., Shenzhen, Guangdong (CN)

(72) Inventors: Yaron Shachar, Munich (DE); Yoav Peleg, Munich (DE); Alex Tal, Munich (DE); Alex Umansky, Munich (DE); Rami Zemach, Munich (DE); Lixia Xiong, Beijing (CN); Yuchun Lu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 205 days.

(21) Appl. No.: 14/974,349

(22) Filed: Dec. 18, 2015

(65) Prior Publication Data
US 2016/0103777 A1    Apr. 14, 2016

Related U.S. Application Data

(63) Continuation of application No. PCT/EP2013/062727, filed on Jun. 19, 2013.

(51) Int. Cl.
| | |
|---|---|
| G06F 13/00 | (2006.01) |
| G06F 13/37 | (2006.01) |
| G06F 5/06 | (2006.01) |
| G06F 13/16 | (2006.01) |
| G06F 13/42 | (2006.01) |

(52) U.S. Cl.
CPC .......... *G06F 13/37* (2013.01); *G06F 5/065* (2013.01); *G06F 13/1673* (2013.01); *G06F 13/4234* (2013.01)

(58) Field of Classification Search
CPC .................................................. G06F 9/30007
See application file for complete search history.

(56) References Cited

U.S. PATENT DOCUMENTS

| | | | |
|---|---|---|---|
| 5,663,910 A | 9/1997 | Ko et al. | |
| 7,149,139 B1 * | 12/2006 | Rosen ...................... | G06F 5/16 |
| | | | 365/189.04 |

(Continued)

FOREIGN PATENT DOCUMENTS

| | | |
|---|---|---|
| CN | 1552016 A | 12/2004 |
| CN | 101622790 A | 1/2010 |

OTHER PUBLICATIONS

Kam Hoi Cheng, "A Simultaneous Access Queue", Journal of Parallel and Distributed Computing, May 1990, p. 83-86.

*Primary Examiner* — Henry Tsai
*Assistant Examiner* — Juanito Borromeo

(57) ABSTRACT

The invention relates to a memory aggregation device for storing a set of input data streams and retrieving data to a set of output data streams, the memory aggregation device comprising: a set of first-in first-out (FIFO) memories each comprising an input and an output; an input interconnector configured to interconnect each one of the set of input data streams to each input of the set of FIFO memories according to an input interconnection matrix; an output interconnector configured to interconnect each output of the set of FIFO memories to each one of the set of output data streams according to an output interconnection matrix; an input selector; an output selector; and a memory controller.

13 Claims, 9 Drawing Sheets

(56) References Cited

U.S. PATENT DOCUMENTS

| | | | |
|---|---|---|---|
| 7,636,361 B1* | 12/2009 | Ebergen | H04L 49/40 |
| | | | 370/236 |
| 7,698,498 B2* | 4/2010 | Lakshmanamurthy | |
| | | | G06F 13/1631 |
| | | | 710/6 |
| 2003/0043156 A1 | 3/2003 | Macy et al. | |
| 2008/0244245 A1 | 10/2008 | Lim et al. | |
| 2009/0086737 A1 | 4/2009 | Fairhurst et al. | |
| 2012/0203982 A1 | 8/2012 | Taneda | |

* cited by examiner

MEMORY AGGREGATION DEVICE

CROSS-REFERENCE TO RELATED APPLICATIONS

This application is a continuation of International Application No. PCT/EP2013/062727, filed on Jun. 19, 2013, which is hereby incorporated by reference in its entirety.

BACKGROUND

The present invention relates to a memory aggregation device and to a method for storing multiple input data streams in a set of FIFO memories and for retrieving multiple output data streams from the set of FIFO memories.

High speed hardware often requires an aggregation of many streams of data into a single stream of data. This is commonly done today using multiple FIFOs in the input of the system and a mechanism that schedules the traffic out as a single stream. This has a downside since the different FIFOs use different memories and these are not shared. This can cause a major waste of memory area on the chip.

SUMMARY

It is the object of the invention to provide a concept for a single aggregator FIFO.

This object is achieved by the features of the independent claims. Further implementation forms are apparent from the dependent claims, the description and the figures.

A main idea of the invention is to provide a single aggregator FIFO that uses a shared memory by means of a set of FIFO memories. An interconnection mechanism of the individual FIFO memories makes the FIFO memories behave like a single FIFO using a shared memory.

The interconnection mechanism comprises an input interconnection matrix for interconnecting input traffic to the set of FIFO memories and an output interconnection matrix for interconnecting the FIFO memories to output traffic. The input interconnection and the output interconnection is controlled by a memory controller according to a data aggregation rule.

In order to describe the invention in detail, the following terms, abbreviations and notations will be used:
FIFO: First-In First-Out,
VLSI: Very large scale integration,
QoS: quality of service,
CPU: central processing unit,
RR: round-robin,
RCS: rate control selection or rate limiting,
LVP: lookup vector prepare,
PFF: pre-fix forest,
req_vec: set of requests or vector of requests,
ack_vec: set of acknowledgements or vector of acknowledgements,
raw_mask: set of selection masks or vector of selection masks,
CMP: compare
NASO: Not And Shift One module,
TE, Bld, Sel: designate different queue groups which may have different priorities, PD: propagation delay, FA, HA: adders implementing the prefix tree.

According to a first aspect, the invention relates to a memory aggregation device for storing a set of input data streams and retrieving data to a set of output data streams, both the set of input data streams and the set of output data streams being operable to perform one of sending and stop sending new data in each clock cycle, the memory aggregation device comprising: a set of FIFO memories each comprising an input and an output; an input interconnector configured to interconnect each one of the set of input data streams to each input of the set of FIFO memories according to an input interconnection matrix; an output interconnector configured to interconnect each output of the set of FIFO memories to each one of the set of output data streams according to an output interconnection matrix; an input selector configured to select the input interconnection matrix according to an input data scheduling scheme; an output selector configured to select the output interconnection matrix according to an output data scheduling scheme; and a memory controller coupled to both, the input selector and the output selector, wherein the memory controller is configured to control the input data scheduling scheme such that data from the set of input data streams is spread among the set of FIFO memories in a round-robin manner and to control the output data scheduling scheme such that data from the set of FIFO memories is retrieved to the set of output data streams in a round-robin manner.

By using the Round-Robin mechanism, the entire memory aggregation device, i.e. the wide-FIFO behaves in a "First In First Out" manner. Each request will be processed at nearly the same time. Thus, the memory aggregation device is operating as a single aggregator FIFO and a throughput of the memory aggregation device is highly efficient.

When data from the set of input data streams is spread among the set of FIFO memories, the FIFO memories are uniformly loaded and no overload will occur. A throughput of the FIFO memories is increased.

The input/output interconnects may be implemented as synchronous hardware circuit schedulers. The input/output interconnects are able to select N requests, e.g. input queues or output queues, according to a certain scheduling scheme and the input/output interconnects are able to perform P selections or issues in each clock cycle. Thus, the input/output interconnects grant processing requests in a rate higher than the system clock at low latency.

The input/output interconnects can be used as a scheduler of tasks among CPUs, or scheduling of packets of data on a switching or routing element. They are used as a building block for the memory aggregation device in order to produce a complex scheduling scheme. The input/output interconnects are concatenating several task schedulers, configured differently in order to produce the hierarchical scheduling scheme of the memory aggregation device. This allows the memory aggregation device to behave like a single shared memory, thereby allowing application of uniformly designed FIFO memories.

In a first possible implementation form of the memory aggregation device according to the first aspect, a number of the FIFO memories correspond to a number of the input data streams.

When the number of FIFO memories corresponds to the number of input data streams, the memory aggregation device is easy to design.

In a second possible implementation form of the memory aggregation device according to the first aspect as such or according to the first implementation form of the first aspect, the input interconnector comprises a set of multiplexers for implementing the input interconnection matrix and the output interconnector comprises a set of multiplexers for implementing the output interconnection matrix.

The set of multiplexers, e.g. implemented as standard gate arrays in a VLSI system design facilitate the design of the memory aggregation device and its portability to different hardware platforms.

In a third possible implementation form of the memory aggregation device according to the second implementation form of the first aspect, the input selector comprises a gate-tree-arbiter logic configured for controlling the set of multiplexers of the input interconnector and the output selector comprises a gate-tree-arbiter logic configured for controlling the set of multiplexers of the output interconnector.

The gate-tree-arbiter logic is an efficient hardware structure for fast switching.

In a fourth possible implementation form of the memory aggregation device according to the first aspect as such or according to any of the preceding implementation forms of the first aspect, the input selector is configured to select the input interconnection matrix such that only data streams of the set of input data streams having valid data requests are interconnected to the set of FIFO memories.

By that kind of processing, throughput of the memory aggregation device is increased because no invalid data streams are processed or stored in the memory aggregation device.

According to a second aspect, the invention relates to a memory aggregation device for storing a set of input data streams and retrieving data to a set of output data streams, both the set of input data streams and the set of output data streams being operable to perform one of sending and stop sending new data in each clock cycle, the memory aggregation device comprising: a set of FIFO memories each comprising an input and an output; an input interconnector configured to interconnect each one of the set of input data streams to each input of the set of FIFO memories according to an input interconnection matrix; an output interconnector configured to interconnect each output of the set of FIFO memories to each one of the set of output data streams according to an output interconnection matrix; an input selector configured to select the input interconnection matrix such that data streams of the set of input data streams having valid data requests are compressed to a continuous set of data requests in the set of FIFO memories; an output selector configured to select the output interconnection matrix according to an output data scheduling scheme; and a memory controller coupled to both, the input selector and the output selector.

Compression of input data streams is essential in order to make the set of FIFOs work as one wide FIFO.

In a first possible implementation form of the memory aggregation device according to the second aspect, the input selector is configured to select the input interconnection matrix such that the data streams of the set of input data streams having valid data requests are aligned with a FIFO pointer pointing to a vacant entry in the set of FIFO memories.

When only data streams with valid data requests are aligned with a FIFO pointer pointing to a vacant FIFO entry, data throughput is increased as non-valid data requests are hold off from being interconnected.

In a second possible implementation form of the memory aggregation device according to the second aspect as such or according to the first implementation form of the second aspect, the memory aggregation device comprises a clock input for receiving a clock signal, wherein the input selector is configured to switch the input interconnection matrix in each clock cycle of the clock signal; and wherein the output selector is configured to switch the output interconnection matrix in each clock cycle of the clock signal.

When input and output interconnection matrices are switched in each clock cycle, each clock cycle new data requests can be stored in the FIFO memories thereby reducing the delay times and increasing the throughput of the memory aggregation device.

In a third possible implementation form of the memory aggregation device according to the second implementation form of the second aspect, the input selector is configured to receive an R-bit vector indicating a number of data streams of the set of input data streams having valid data requests and configured to select the input interconnection matrix such that in each clock cycle of the clock signal the first G data requests of the data streams of the set of input data streams are interconnected to the set of FIFO memories, wherein R and G are integer numbers.

Thus, in each clock cycle G data requests are processed by the memory aggregation device which results in an increased throughput rate.

In a fourth possible implementation form of the memory aggregation device according to the second implementation form or the third implementation form of the second aspect, the output selector is configured to receive an R-bit vector indicating a number of data streams of the set of output data streams having valid data requests and configured to select the output interconnection matrix such that in each clock cycle of the clock signal the first G data requests of the data streams of the set of output data streams are interconnected to the set of FIFO memories, wherein R and G are integer numbers.

By that kind of processing, throughput of the memory aggregation device is increased.

In a fifth possible implementation form of the memory aggregation device according to the third implementation form or the fourth implementation form of the second aspect, the memory controller is configured to control R and G depending on a number of vacant entries in the set of FIFO memories.

By that feature, data throughput can be controlled depending on free capacity of the memory aggregation device. If the memory aggregation device is full, traffic can be forwarded to other devices.

According to a third aspect, the invention relates to a method for storing a set of input data streams in a set of FIFO memories and retrieving data from the set of FIFO memories to a set of output data streams, both the set of input data streams and the set of output data streams being operable to perform one of sending and stop sending new data in each clock cycle, the method comprising: interconnecting each one of the set of input data streams to each input of the set of FIFO memories according to an input interconnection matrix; interconnecting each output of the set of FIFO memories to each one of the set of output data streams according to an output interconnection matrix; selecting the input interconnection matrix according to an input data scheduling scheme; selecting the output interconnection matrix according to an output data scheduling scheme; and controlling the input data scheduling scheme such that data from the set of input data streams is spread among the set of FIFO memories in a round-robin manner and controlling the output data scheduling scheme such that data from the set of FIFO memories is retrieved to the set of output data streams in a round-robin manner.

By using the Round-Robin mechanism, the storing in and retrieving from the single FIFO memories is operating in a "First In First Out" manner. Each request will be processed at nearly the same time. Thus, the behavior of a single aggregator FIFO is reached and a throughput of the method becomes highly efficient.

In a first possible implementation form of the method according to the third aspect, the selecting the input interconnection matrix is based on a gate-tree-arbiter logic; and the selecting the output interconnection matrix is based on a gate-tree-arbiter logic.

The gate-tree-arbiter logic is an efficient hardware structure for fast switching.

In the following, the term input/output selector designates the input selector as well as the output selector and designates a device comprising both, the input selector and the output selector.

The input/output selector may be implemented as a synchronous hardware circuit scheduler. The input/output selector is able to select N requests, e.g. input queues, according to a certain scheduling scheme and the input/output selector is able to perform P selections or issues in each clock cycle. Thus, the input/output selector grants processing requests in a rate higher than the system clock at low latency.

The input/output selector can be used as a scheduler of tasks among CPUs, or scheduling of packets of data on a switching or routing element. It can also be used as a building block for a more complex scheduler such as the memory aggregation device according to the first or the second aspect in order to produce a more complex scheduling scheme. In this sense the input/output selector can be concatenating several task schedulers, configured differently in order to produce a hierarchical scheduling scheme.

The memory aggregation device according to aspects of the invention builds an aggregated repository that can receive up to N inputs each clock and also extract up to M outputs each clock, where N and M are constants, and on each clock each input can have a data to insert or not. The number of outputs that are operable to receive data is also changing using a valid vector input. In case not all valid outputs are used the outputs are right-aligned, meaning that for P valid data outputs, they are send on outputs 0 through P−1.

The memory aggregation device according to aspects of the invention can be used as a link aggregator, as a shared pool of data that needs to be processed and as another kind of aggregation device.

BRIEF DESCRIPTION OF THE DRAWINGS

Further embodiments of the invention will be described with respect to the following figures, in which.

DETAILED DESCRIPTION

Figure 1:
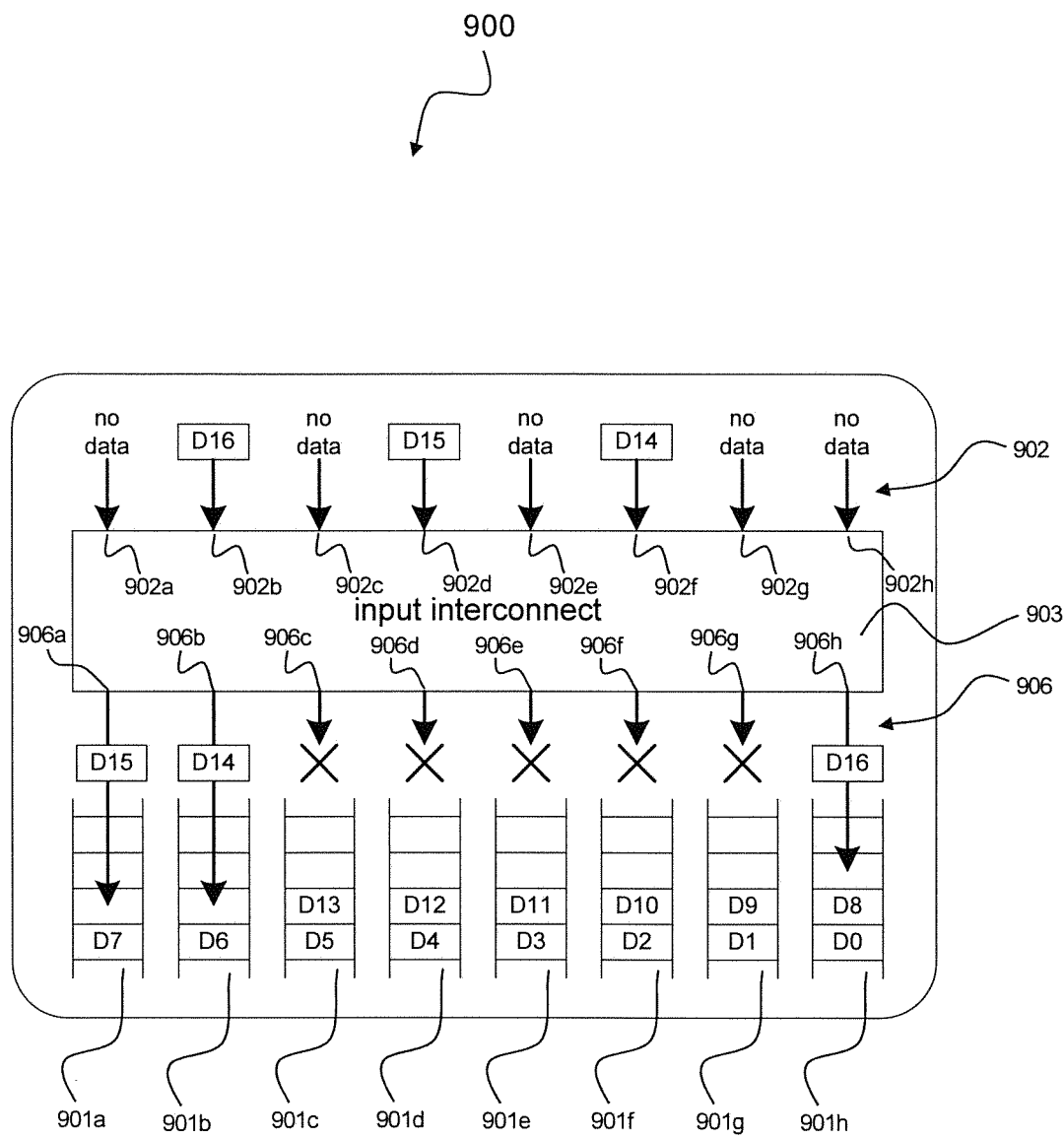
FIG. 1 shows a block diagram of an input interconnect of a memory aggregation device according to an implementation form.

FIG. 1 shows a block diagram of an input interconnect 903 of a memory aggregation device 900 according to an implementation form.

The memory aggregation device 900 also denoted as "Wide-Aggregator" is built using a set of N standard FIFOs 901*a*, 901*b*, 901*c*, 901*d*, 901*e*, 901*f*, 901*g*, 901*h* that are connected to both inputs and outputs using two interconnect networks. In an implementation form, the interconnect networks are built from a set of multiplexers (muxes) on the entrance to each FIFO and to each output. The input interconnect 903, also designated as ingress interconnect has a connection of any of the inputs 902*a*, 902*b*, 902*c*, 902*d*, 902*e*, 902*f*, 902*g*, 902*h* with any of the data inputs of the FIFOs memories 901*a*, 901*b*, 901*c*, 901*d*, 901*e*, 901*f*, 901*g*, 901*h* while the control signal of the address that is sent to the memory of each FIFO is controlled using a FIFO-control-logic unit. The control signal to each of the muxes is done using a gate-tree-arbiter which selects only the valid inputs/requests, i.e. inputs that have data to send on each clock in a manner that compresses the requests to a continuous set of requests to the FIFOs. These sets are aligned with the last position of the FIFO pointer.

FIG. 1 depicts a set of requests, i.e. inputs that want to send data and a Wide-Aggregator of N=8 FIFO memories that currently stores 14 entries of data. In this implementation form, three out of the eight possible inputs request to send data and the gate-tree-arbiter shifts the request to the right FIFO inside the Wide-Aggregator.

The input interconnect 903 is configured to receive a set of input data streams 902 at its inputs 902*a*, 902*b*, 902*c*, 902*d*, 902*e*, 902*f*, 902*g*, 902*h*. In the implementation form depicted in FIG. 1, a number of eight input data streams can be received. However, the interconnect 903 may be configured to receive any other number of input data streams.

A first input 902*a* receives a first data stream "no data", a second input 902*b* receives a second data stream "D16", a third input 902*c* receives a third data stream "no data", a fourth input 902*d* receives a fourth data stream "D15", a fifth input 902*e* receives a fifth data stream "no data", a sixth input 902*f* receives a sixth data stream "D14", a seventh input 902*g* receives a seventh data stream "no data" and an eighth input 902*h* receives an eighth data stream "no data".

The input interconnect 903 is configured to switch the set of input data streams 902 to each input of the set of FIFO memories 901*a*, 901*b*, 901*c*, 901*d*, 901*e*, 901*f*, 901*g*, 901*h* according to an input interconnection matrix. In an implementation form, the input interconnection matrix is implemented by a set of multiplexers, i.e., muxes. In the implementation form depicted in FIG. 1, a number of eight FIFO memories are depicted. However, the memory aggregation device 900 may comprise any other number of FIFO memories.

In the implementation form depicted in FIG. 1, the first data stream "no data" is switched to the third output 906*c* of the input interconnect 903 connected to the input of the third FIFO memory 901*c*, the second data stream "D16" is switched to the eighth output 906*h* of the input interconnect 903 connected to the input of the eighth FIFO memory 901*h*, the third data stream "no data" is switched to the fourth output 906*d* of the input interconnect 903 connected to the input of the fourth FIFO memory 901d, the fourth data stream "D15" is switched to the first output 906a of the input interconnect 903 connected to the input of the first FIFO memory 901a, the fifth data stream "no data" is switched to the fifth output 906e of the input interconnect 903 connected to the input of the fifth FIFO memory 901e, the sixth data stream "D14" is switched to the second output 906b of the input interconnect 903 connected to the input of the second FIFO memory 901b, the seventh data stream "no data" is switched to the sixth output 906f of the input interconnect 903 connected to the input of the sixth FIFO memory 901f and the eighth data stream "no data" is switched to the seventh output 906g of the input interconnect 903 connected to the input of the seventh FIFO memory 901g.

In an implementation form, the control logic of both input interconnect 903 and output interconnect (not shown in FIG. 1) is done using an arbiter logic. This arbiter receives an R bit vector that indicates the requests and selects/grants the first G requests every clock. In an implementation form a Gate-Tree-Arbiter is used to perform this task every clock. In the input arbiter R would be set to N while G would be set to N in case the Wide-Aggregator has more than N vacant entries and less if it has less. In the output arbiter R would be set to N if the Wide-Aggregator has at least N valid entries or less if it has less, while G would be set to P (P≤N).

The Wide-Aggregator can receive new data each clock and direct it to the correct FIFO input and the same way with the direction of FIFO outputs to the different output streams and therefore both arbiters must be able to perform a new arbitration each clock. This is a hard task to do with the limitation of high clock frequency in VLSI systems with increasing N constants. In order to perform this, a gate-forest-arbiter may be used in the input and output selectors as described below with respect to FIGS. 4 and 5. This kind of arbiter performs the selection in a two stage pipe that can receive a new set of requests each clock.

The following figure describes the block diagram for a memory aggregation device 990, also called as "Wide FIFO" when describing the specific FIFO related aspects of the memory aggregation device.

Figure 2:
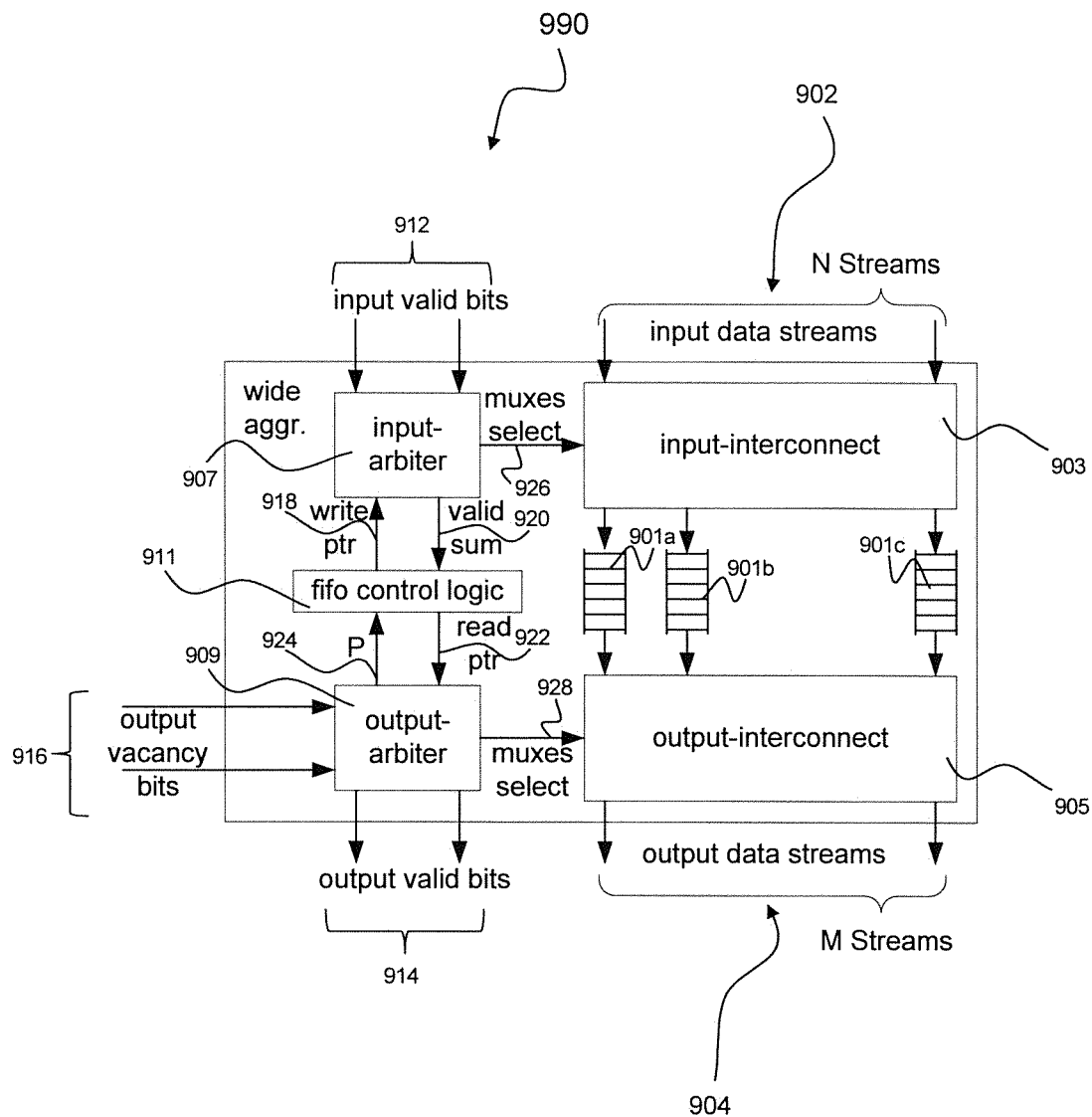
FIG. 2 shows a block diagram of a memory aggregation device according to an implementation form.

FIG. 2 shows a block diagram of a memory aggregation device 990 according to an implementation form. The memory aggregation device 990 is configured to store a set of input data streams 902 and to retrieve data to a set of output data streams 904. The memory aggregation device comprises a set of FIFO memories 901a, 901b, 901c each comprising an input and an output, an input interconnect 903, an output interconnect 905, an input selector also called input arbiter 907, an output selector also called output arbiter 909 and a memory controller 911 shown as FIFO control logic.

The input interconnect 903 is configured to interconnect each input data stream 902 to each input of the FIFO memories 901a, 901b, 901c according to an input interconnection matrix. The output interconnect 905 is configured to interconnect each output of the FIFO memories 901a, 901b, 901c to each output data stream 904 according to an output interconnection matrix. The input selector 907 is configured to select the input interconnection matrix according to an input data scheduling scheme. The output selector 909 is configured to select the output interconnection matrix according to an output data scheduling scheme. The memory controller 911 is coupled to both, the input selector 907 and the output selector 909 and is configured to control the input data scheduling scheme and the output data scheduling scheme according to a data aggregation rule.

In an implementation form, the data aggregation rule is such that data from the set of input data streams 902 is spread among the set of FIFO memories 901a, 901b, 901c and that data from the set of FIFO memories 901a, 901b, 901c is retrieved to the set of output data streams 904. In an implementation form, both, the input data scheduling scheme and the output data scheduling scheme are round-robin scheduling schemes. In an implementation form, the memory controller 911 addresses the set of FIFO memories 901a, 901b, 901c as a single FIFO memory having a single write pointer 918 for storing the set of input data streams 902 to the single FIFO memory and having a single read pointer 922 for retrieving data from the single FIFO memory to the set of output data streams 904. In an implementation form, for each data request of the set of input data streams 902 the single write pointer 918 advances from a vacant entry of a first FIFO memory 901a to a vacant entry of a last FIFO memory 901c and jumps back to a next vacant entry of the first FIFO memory 901a if the last FIFO memory 901c is reached. In an implementation form, for each data request of the set of output data streams 904 the single read pointer 922 advances from an occupied entry of a first FIFO memory 901a to an occupied entry of a last FIFO memory 901c and jumps back to a next occupied entry of the first FIFO memory 901a if the last FIFO memory 901c is reached. The input interconnect 903 comprises a set of multiplexers for implementing the input interconnection matrix and the output interconnect 905 comprises a set of multiplexers for implementing the output interconnection matrix.

The input selector 907 comprises a gate-tree-arbiter logic configured for controlling the set of multiplexers of the input interconnect 903. In an implementation form, the gate-tree-arbiter logic corresponds to the device described below with respect to FIGS. 4 to 10. Controlling is achieved by sending a control signal "muxes select" 926 from the input selector 907 to the input interconnect 903. The output selector 909 comprises a gate-tree-arbiter logic configured for controlling the set of multiplexers of the output interconnect 905. In an implementation form, the gate-tree-arbiter logic corresponds to the device described below with respect to FIGS. 4 to 10. Controlling is achieved by sending a control signal "muxes select" 928 from the output selector 909 to the output interconnect 905. In an implementation form, both gate-tree-arbiter logics (of input and output selector) are identical. In an implementation form, the gate-tree-arbiter logic of the input selector comprise a gate tree of a higher dimension than the gate-tree-arbiter of the output selector.

In an implementation form, the input selector 907 selects the input interconnection matrix such that only data streams of the set of input data streams 902 having valid data requests are interconnected to the set of FIFO memories 901. The input selector 907 is configured to receive input valid bits 912 for performing the selection. In an implementation form, the input selector 907 is configured to select the input interconnection matrix such that the data streams of the set of input data streams 902 having valid data requests indicated by the input valid bits 912 are compressed to a continuous set of data requests in the set of FIFO memories 901a, 901b and 901c. In an implementation form, the input selector 907 selects the input interconnection matrix such that the data streams of the set of input data streams 902 having valid data requests indicated by the input valid bits 912 are aligned with a FIFO pointer pointing to a vacant entry in the set of FIFO memories 901a, 901b, 901c.

In an implementation form, the memory aggregation device 990 comprises a clock input for receiving a clock signal. The input selector 907 switches the input interconnection matrix in each clock cycle of the clock signal and the output selector 909 switches the output interconnection matrix in each clock cycle of the clock signal. In an implementation form, the input selector 907 is configured to receive the input valid bits 912 in a form of an R-bit vector indicating a number of data streams of the set of input data streams 902 having valid data requests and to select the input interconnection matrix such that in each clock cycle of the clock signal the first G data requests of the data streams of the set of input data streams 902 are interconnected to the set of FIFO memories 901a, 901b, 901c. The output arbiter 909 is configured to receive an output vacancy bits 916, which is in a form of a vector of R (number of output data streams) bits that indicate which of the output data streams 904 is able to receive a data element, from the set of the FIFO memories 901a, 901b, 901c, and which output data streams cannot. The output arbiter 909 is configured to exert "mux select" signals 928 which indicate the output interconnection matrix 905 the output of which FIFO-memory to send to which output-data-stream 904. The output interconnection matrix 905 is configured to connect the outputs of the set of the FIFO memories 901a, 901b, 901c to the output-data-streams 904 accordingly. The output arbiter 909 is further configured to extract an output valid bits 914 which indicate which of the outputs data streams where selected. R and G are integer numbers. In an implementation form, the memory controller 911 receives a number P of processed requests 924 from the output selector 909 and a valid sum signal 920 from the input selector 907 that are used for controlling the FIFO memories 901a, 901b, 901c.

In an implementation form, the memory aggregation device 990 has the following functionality: After the memory aggregation device, i.e. the arbiter 990 selects the G requests and right-aligns them, they are shifted according to the read pointer's 922 lower lgN bits and the write pointer's 918 lower lgN bits in the output selector, i.e. output arbiter 909 and in the input selector, i.e. input arbiter 907 accordingly.

The memory controller "FIFO control logic" 911 addresses the set of FIFOs 901a, 901b, 901c as a single FIFO that has a single write pointer 918 and a single read pointer 922. However, these pointers are advancing on the memory aggregation device, i.e. the Wide-Aggregator 990 in a round robin manner. This means that when a single data is inserted into the memory aggregation device, i.e. the Wide-Aggregator 990, the write pointer 918 advances horizontally, i.e. pointing to a neighbour FIFO 901b and when it reaches the last FIFO 901c it jumps back to the first one 901a while advancing vertically, i.e. pointing to the next entry in the first FIFO 901a. The read-pointer 922 does the same. Since the push and pop operations on the Wide FIFO 901a, 901b, 901c includes dynamic number of push and pop operations each clock these pointers 918, 922 can advance more than 1 entry and every amount of N they wrap around.

Figure 3:
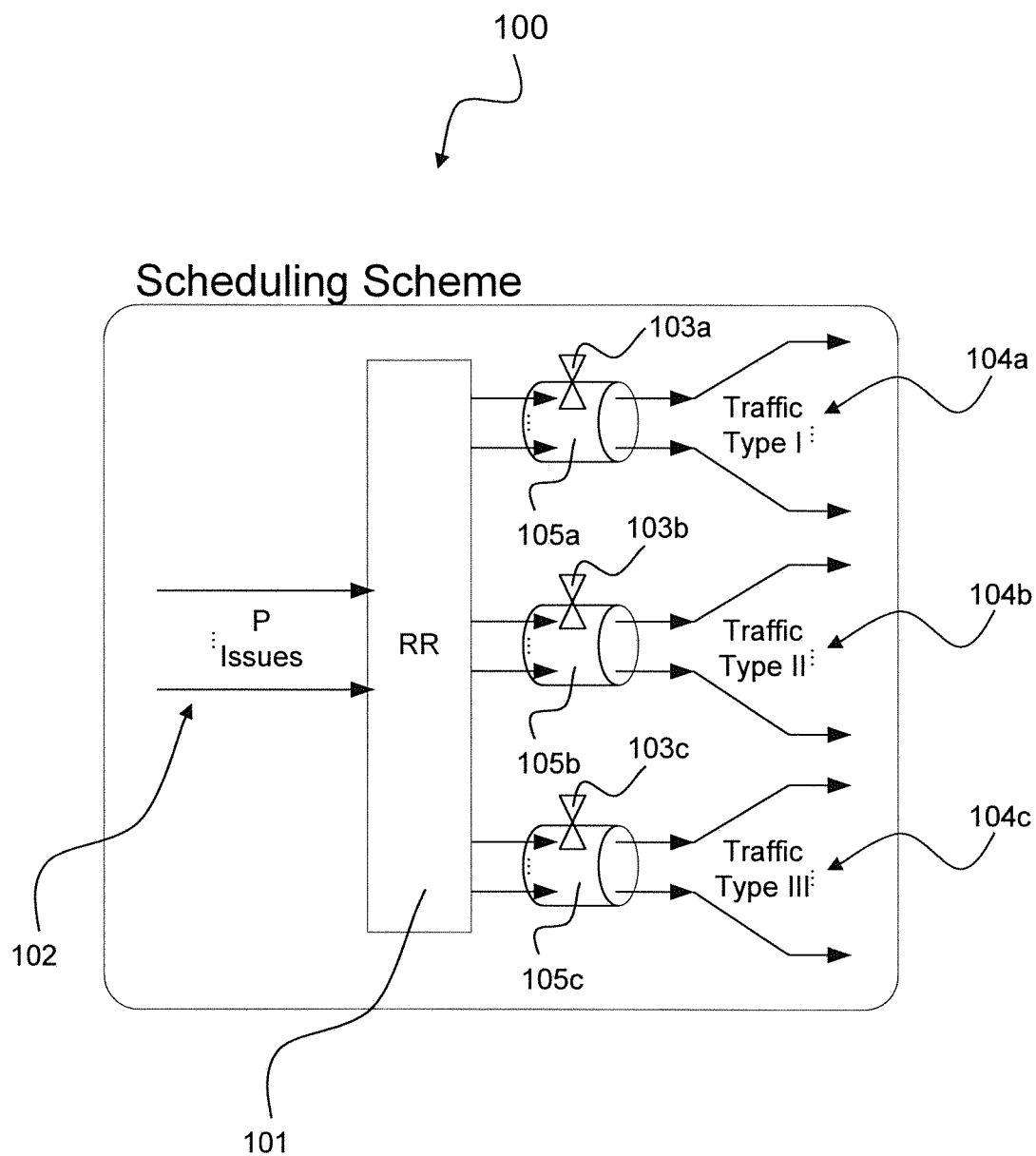
FIG. 3 shows a block diagram of a scheduling scheme according to an implementation form.

FIG. 3 shows a block diagram of a scheduling scheme 100 according to an implementation form. The scheduling scheme 100 performs a Round Robin (RR) 101 between the requests 102 with aggregated bandwidth limitations, called shaping, on different traffic types 104a, 104b, 104c although different types of scheduling can be applied using the same mechanism.

The scheduler scheme 100 implements a simple scheduling arbitration that includes a simple round-robin 101 and a rate-limiting mechanism 103a, 103b, 103c for a fixed amount of traffic types 104a, 104b and 104c. A first rate-limiting 103a is performed for a first traffic type 104a by using a first shaper bucket 105a, e.g. a FIFO. A second rate-limiting 103b is performed for a second traffic type 104b by using a second shaper bucket 105b, e.g. a FIFO. A third rate-limiting 103c is performed for a third traffic type 104c by using a third shaper bucket 105c, e.g. a FIFO. Each type bandwidth is limited according to a configurable rate, and in case it exceeds its allowed bandwidth of grants, its requests are masked and grants are given to all remaining non-masked traffic types.

In an implementation form, the scheduling scheme 100 is applied by the input selector 907 as described with respect to FIGS. 1 and 2. In an implementation form, the scheduling scheme 100 is applied by the output selector 909 as described with respect to FIG. 2.

Figure 4:
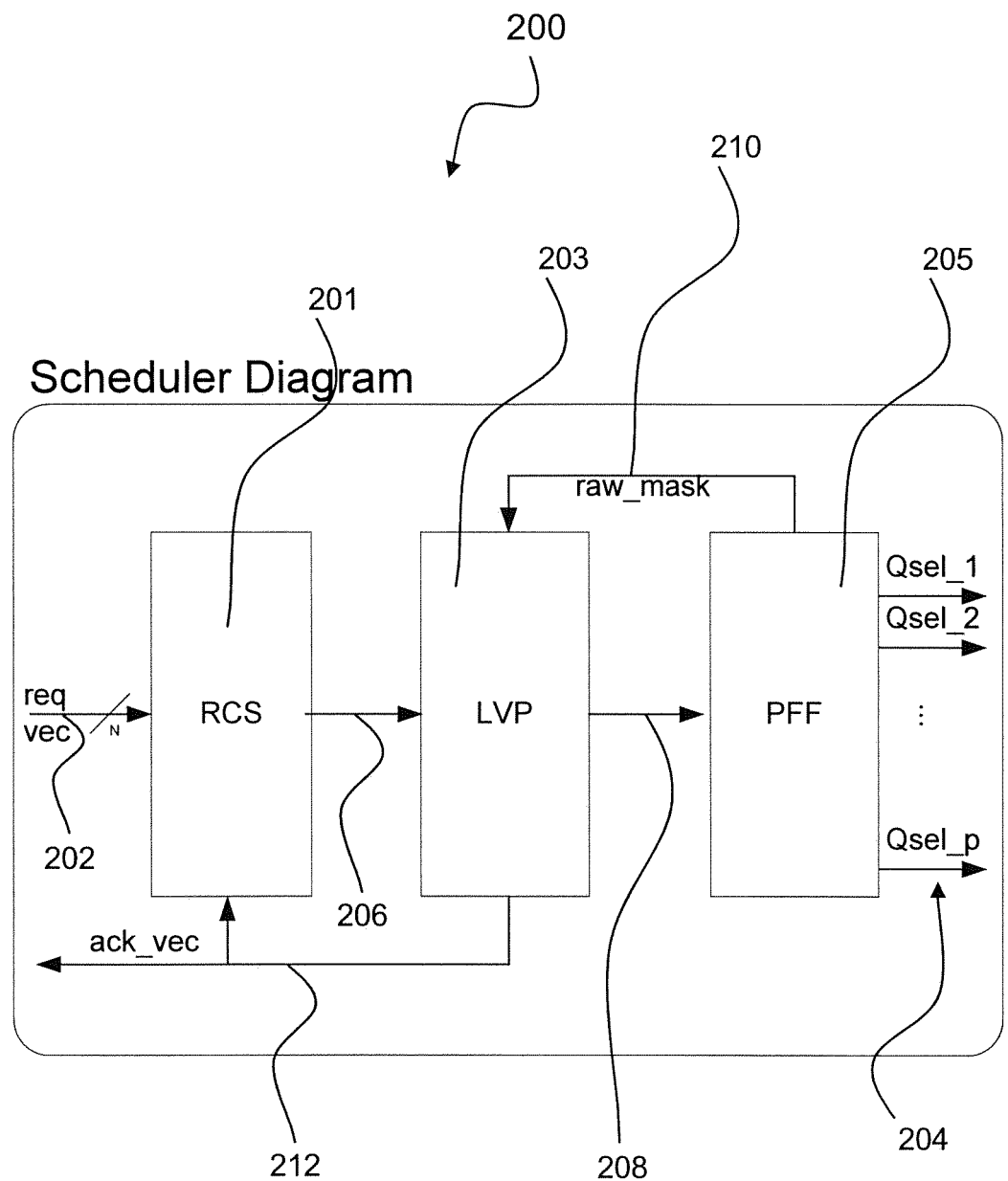
FIG. 4 shows a block diagram of an input/output selector according to an implementation form.

FIG. 4 shows a block diagram of an input/output selector 200 according to an implementation form. The term input/output selector 200 relates to both, an input selector 907 shown as input arbiter and to an output selector 909 shown input arbiter as described with respect to FIGS. 1 and 2. That means, the input/output selector 200 can be an input selector 907 or an output selector 909. The input/output selectors 907 and 909 are also call input/output scheduling device, or scheduler.

The input/output selector 200 is configured for receiving a set of requests "req vec", i.e. a request vector 202 and for providing a set of grants "Qsel_1, Qsel_2, . . . , Qsel_p" 204 to the set of requests 202. In the implementation foist depicted in FIG. 4 a size of the set of requests 202 is N, i.e. a number of N requests is input to the input/output selector 200. In the implementation form depicted in FIG. 4 a size of the set of grants 204 is P, i.e. a number of P grants is provided by the input/output selector 200. In an implementation form N requests are received by the input/output selector 200 in each clock cycle and P grants are provided by the input/output selector 200 in each clock cycle. In an implementation form, P acknowledgements 212 are provided by the input/output selector 200 according to the P grants 204 in each clock cycle.

The input/output selector 200 comprises a rate limiting unit, also called rate control shaper (RCS) 201, a lookup vector prepare unit (LVP) 203 and a prefix forest unit (PFF) 205. The rate limiting unit 201 is configured for limiting a rate of the set of requests 202 according to a scheduling scheme. The rate limiting unit 201 provides a rate-limited set of requests 206 based on the set of requests 202. The lookup vector prepare unit 203 is coupled to the rate limiting unit 201 such that an output of the rate limiting unit 201 is an input to the lookup vector prepare unit 203. In an implementation form, one or more functional or logical units are coupled into the path between output of the rate limiting unit 201 and input to the lookup vector prepare unit 203.

The lookup vector prepare unit 203 is configured to provide a lookup vector prepared set of requests 208 depending on a combination of the rate-limited set of requests 206 and a selection mask "raw_mask" 210. Depending on that combination the lookup vector prepare unit 203 provides a set of acknowledgements "ack_vec", i.e. an acknowledgement vector 212 to the set of requests 202. In an implementation form, the rate-limited set of requests 206 and the selection mask 210 are merged to provide the lookup vector prepared set of requests 208 and the set of acknowledgements 212. There are various well known solutions performing the combination or merging. In another implementation form, the lookup vector prepare unit 203 is configured to provide a lookup vector prepared set of requests 208 depending on a combination of the set of requests 202 and a selection mask "raw_mask" 210 when the set of requests 202 are directly provided to the lookup vector prepare unit 203.

The prefix forest unit 205 is coupled to the lookup vector prepare unit 203 such that an output of the lookup vector prepare unit 203 is an input to the prefix forest unit 205. In an implementation form, one or more functional or logical units are coupled into the path between output of the lookup vector prepare unit 203 and input to the prefix forest unit 205.

The prefix forest unit 205 is configured to provide the set of grants 204 as a function of the lookup vector prepared set of requests 208. The prefix forest unit 205 is further configured to provide the selection mask 210 based on the set of grants 204. An implementation form of the prefix forest unit 205 is described below with respect to FIGS. 7 and 8.

In an implementation form, the input/output selector provides a number of P grants 204 upon a number of N requests 202, where the number P is smaller than the number N. In an implementation form the number P is approximating the number N such that in each clock cycle most of the N requests are scheduled and only a small number of N–P requests are stored in the input/output selector 200 for further processing. In an implementation form the rate limiting unit 201 is configured to limit the rate of the set of requests 202 depending on the set of acknowledgements 212. If a number of acknowledgements is high, the rate limitation performed by the rate limiting unit 201 is small, thus the throughput of the input/output selector 200 is high and the delay time of the requests 202 being processed by the input/output selector 200 is low. If the number of acknowledgements is small, the rate limitation performed by the rate limiting unit 201 is high, thus the throughput of the input/output selector 200 is low and the delay time of the requests 202 being processed by the input/output selector 200 is large.

In an implementation form, the processing of the input/output selector 200 is based on queue groups the set of requests 202 and the set of acknowledgements 212 are assigned to. In an implementation form, queue groups are configured to implement priority queues, i.e. groups of queues having different priorities and therefore different delay times depending on their priority. The set of request 202 are assigned to different priorities. A request 202 assigned to a high priority is processed faster than a request assigned to a low priority.

In an implementation form, the input/output selector 200 is constructed from an N→1 arbiter that selects P inputs from up to N requests 202. In an implementation form, the requests 202 are built out of input queues states. Each queue in the input of the system sends a request 202 to the input/output selector 200 every clock and receives an acknowledge 212 that indicates that the request 202 was received by the scheduler 200 and would be granted in the next future. When a queue has received an acknowledge 212 it can already send the next request 202. In an implementation form, a request 202 is sent to the scheduler 200 for every message in the input queues.

The scheduler 200 is based on a detachment between scheduling and acknowledging requests. This detachment enables the scheduler 200 to supply the Requestor module, which is also called Requestor side, with an acknowledge vector 212 almost immediately and therefore enables the Requestor module to supply the scheduler 200 with new requests 202 every clock. The actual selection is done only a single clock or possibly several clocks after, but is detached from the acknowledged requests.

The request vector 202 is masked according to the rate limiting unit 201 which is responsible for the rate limiting of each of the groups type. The result 206 is sent to the lookup vector prepare unit (LVP) 203 which is responsible for merging the last selected requests with the new request vector 206. The lookup vector prepare unit 203 merges the two vectors 206 and 210, sends the new vector 208 for the prefix forest unit (PFF) 205 for the selection, and sends an acknowledge vector 212 to the Requestor side.

Figure 5:
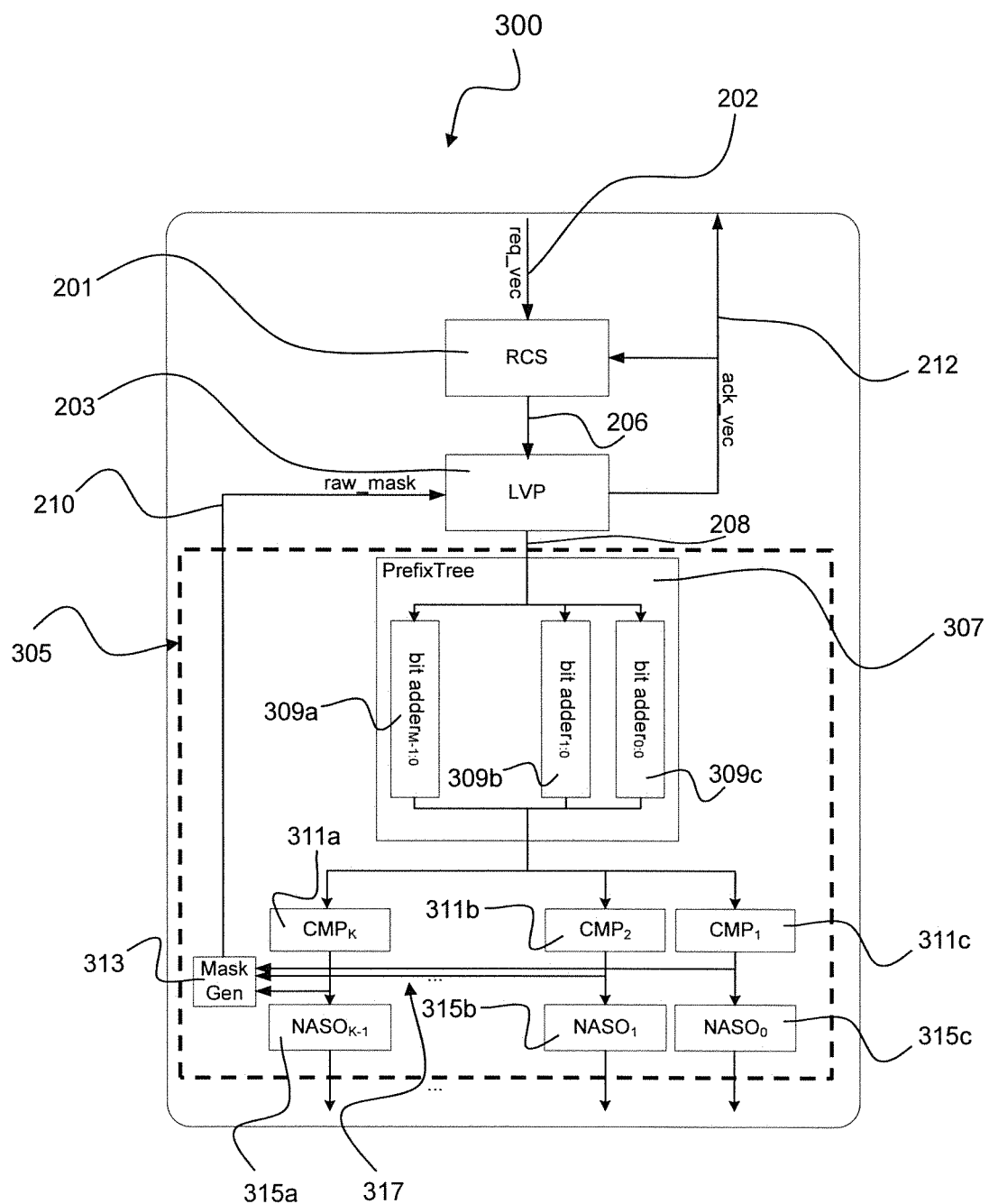
FIG. 5 shows a block diagram of an input/output selector according to an implementation form.

FIG. 5 shows a block diagram of an input/output selector 300 according to an implementation form. The input/output selector 300 is configured for receiving a set of requests "req vec", i.e. a request vector 202 and for providing a set of grants "Qsel_1, Qsel_2, . . . , Qsel_p" 304 to the set of requests 202. The input/output selector 300 comprises a rate limiting unit (RCS) 201 which may correspond to the rate limiting unit 201 described with respect to FIG. 4, a lookup vector prepare unit (LVP) 203 which may correspond to the lookup vector prepare unit 203 described with respect to FIG. 4 and a prefix forest unit (PFF) 305 which may be an implementation form of the prefix forest unit 205 described with respect to FIG. 4.

The rate limiting unit 201 is configured for limiting a rate of the set of requests 202 according to a certain scheduling scheme. The rate limiting unit 201 provides a set of rate-limited set of requests 206 based on the set of requests 202. The lookup vector prepare unit 203 is coupled to the rate limiting unit 201 such that an output of the rate limiting unit 201 is an input to the lookup vector prepare unit 203. In an implementation form, one or more functional or logical units are coupled into the path between output of the rate limiting unit 201 and input to the lookup vector prepare unit 203. The lookup vector prepare unit 203 is configured to provide a lookup vector prepared set of requests 208 depending on a combination of the rate-limited set of requests 206 and a selection mask "raw_mask" 210. Depending on that combination the lookup vector prepare unit 203 provides a set of acknowledgements "ack_vec", i.e. an acknowledgement vector 212 to the set of requests 202.

The prefix forest unit 305 comprises a prefix tree 307, a set of compare (CMP) modules 311a, 311b and 311c, a mask generator 313 and a set of Not_And_Shift_One (NASO) modules 315a, 315b and 315c.

The prefix tree 307 is an ordered tree data structure that is used to store an associative array where the keys are usually strings. Unlike a binary search tree, no node in the tree 307 stores the key associated with that node; instead, its position in the tree 307 defines the key with which it is associated. All the descendants of a node have a common prefix of the string associated with that node, and the root is associated with the empty string. Values are normally not associated with every node, only with leaves and some inner nodes that correspond to keys of interest.

In an implementation form of the prefix tree 307 looking up a key of length m takes in the worst case a time in the order of O(m). The simple operations the prefix tree 307 uses during lookup, such as array indexing using a character, are fast on real machines. The prefix tree 307 is space-efficient when containing a large number of short keys, since nodes are shared between keys with common initial subsequences. The prefix tree 307 facilitates longest-prefix matching. The number of internal nodes from root to leaf equals the length of the key. Balancing the prefix tree 307 is therefore of no concern. The prefix tree 307 supports ordered iteration and facilitates longest-prefix matching, as a consequence performing such a "closest fit" find can, depending on implementation, be as quick as an exact find. In contrast to an hash table the prefix tree 307 is faster on average at insertion than a hash table because the hash table must rebuild its index when it becomes full which is a very expensive operation. The prefix tree 307 therefore has much better bounded worst-case time costs, which is important for latency-sensitive programs. Since no hash function is used, the prefix tree 307 is generally faster than a hash table for small keys.

In the implementation form depicted in FIG. 5 the prefix tree 307 comprises a set of bit adders 309a, 309b and 309c for implementing the tree. In an implementation form, the prefix tree 307 that yields P results implements the following function on the input vector v(i), i.e., the lookup vector prepared vector:

$$f_z(i:i \in \mathbb{N}) = f_x(i) + f_y(i)$$

$$= \begin{cases} \sum_{j=0}^{i} v(i), & \sum_{j=0}^{i} v(i) < P \\ P, & \sum_{j=0}^{i} v(i) \geq P \end{cases}$$

The fx(i) and fy(i) are function notations. This notation is used to show the mathematical concept behind the physical implementation, and to show that for each output i the above sigma(sum) is computed. The computation is done by summing fx(i) and fy(i) so that to achieve the required result. The computed values are $f_x(i)$ and $f_y(i)$ so that the required result is achieved by combining the different possible results of both according to the prefix tree theorem. The output of the prefix tree process is constructed from two sets of 2*N numbers (log N bits each) that represent the function result to the input vector. For each set of numbers (x,y), the result of the prefix tree process is the addition x+y. The delay complexity of the prefix tree process is O(log N).

The output of the prefix forest unit 305 is a set of numbers called Z and for each number $Z_i$ in Z it holds that $X_i+Y_i=Z_i$. X and Y show a specific example of x and y, respectively, Xi represents the ith specific example X of x, Yi represents the ith specific example Y of y. Instead of performing the actual addition there is the option to let the next phase of the mechanism, that is the comparing phase, use the raw material of $X_i$ and $Y_i$ and instead of comparing each number in Z to the relevant values, it compares a couple to a known set of options and by that it can save the latency that is caused by putting $X_i$ and $Y_i$ into an adding device.

Each compare module 311a, 311b, 311c receives all N sets and extracts an N bit result vector 317. The result vector 317 of compare module number J includes ones on input sets in such a manner that their sum is J. The comparison is done by the compare modules 311a, 311b, 311c by checking all possible combinations of X and Y.

In an implementation form, the possible variation of X and Y for each number, in this example varying from 1 through 8, is according to Table 1.

There are only a maximum of two possible combinations for each output. In order to build the selection mask "raw_mask" which is sent back to the lookup vector prepare unit 203 a mask generator 313 receives the result vector 317 and performs a logic NOR operation on the rest of the outputs. This makes the selection mask "raw_mask" have a '1' for each result which is not 0 to P. i.e. bigger than P, so that it can serve as a mask for the last vector. The Not_And_Shift_One modules 315a, 315b, 315c are configured to perform a logic NAND operation followed by a 1 bit shift operation on their input vector. The Not_And_Shift_One modules 315a, 315b, 315c are responsible to find the first one in the N bit vector received in its inputs and to extract the outputs to the Requestor side. The outputs of the Not_And_Shift_One modules 315a, 315b, 315c form the set of grants 204 as described with respect to FIG. 2 which are provided to the Requestor side.

In an implementation form, the scheduling process of the input/output selector 300 starts with a shaper corresponding to the rate limiting unit 201 that masks the bits that belongs to queues that are not eligible according to the shaper 201. The results corresponding to the rate-limited request vector 206 are then sent to the lookup vector prepare unit 203 that masks, shifts and joins the rate-limited request vector 206 according to the last chosen selection. The shift is used to perform a round-robin between the requests. The result of the shifter corresponding to the lookup vector prepared set of requests 208 is sent to a bit adder 309a, 309b, 309c that is implemented as a parallel counter forest 305. The shifter is implemented as a static shifter. The last req_vec is masked with the mask vector 210.

Figure 6:
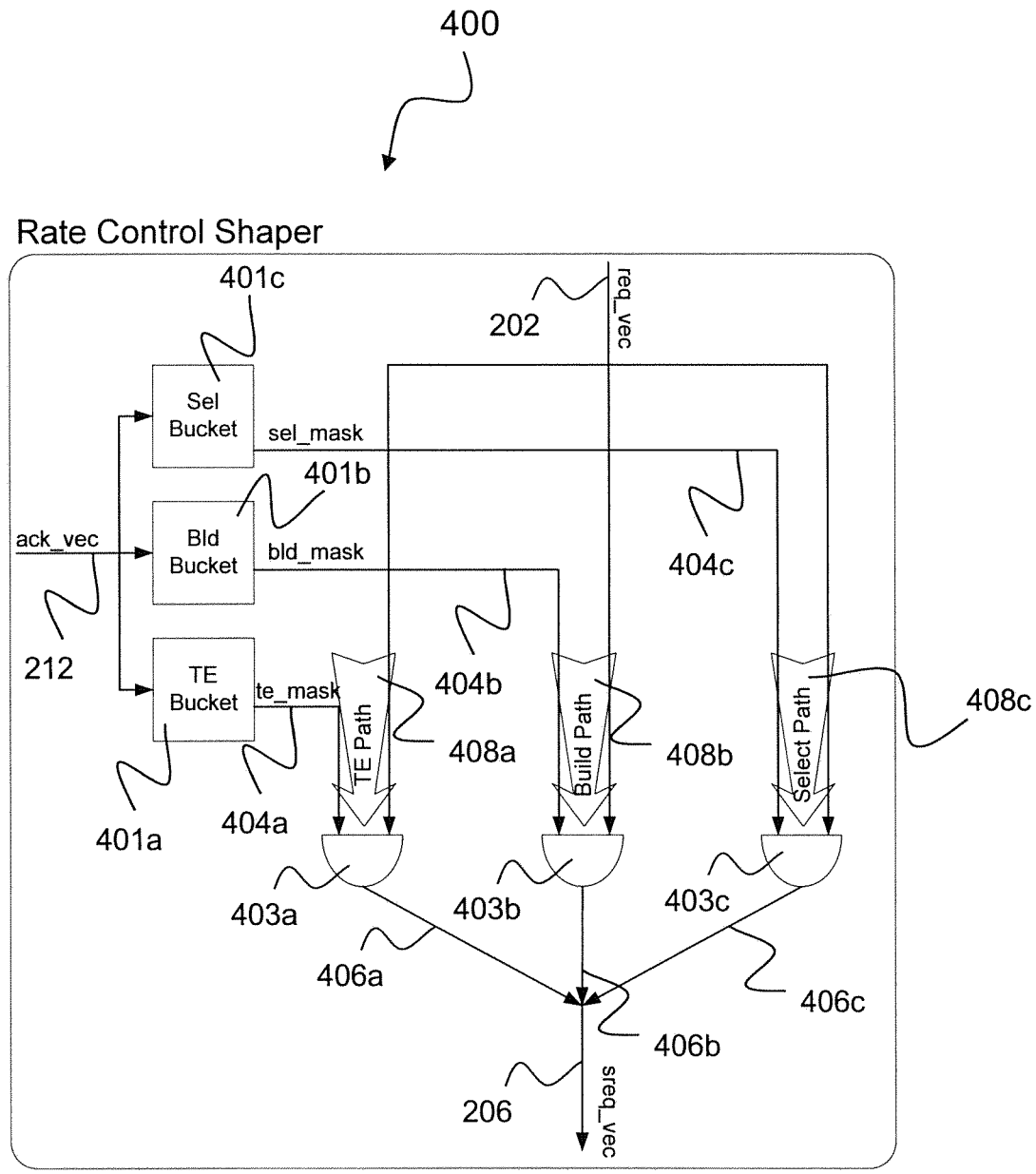
FIG. 6 shows a block diagram of a rate limiting unit of an input/output selector according to an implementation form.

FIG. 6 shows a block diagram of a rate limiting unit 400 of an input/output selector according to an implementation form. The rate limiting unit 400 is an implementation form of the rate limiting unit 201 as described with respect to FIGS. 2 and 3. The rate limiting unit 400 receives the set of requests 202 and the set of acknowledgements 212 as described with respect to FIGS. 2 and 3 and provides the rate-limited set of requests 206 as described with respect to FIGS. 2 and 3. The rate limiting unit 400 comprises a set of buckets 401a, 401b, 401c, e.g. FIFO buffers for temporarily storing the set of acknowledgements 212 according to a specific queue group the acknowledgements 212 and the buckets 401a, 401b, 401c are assigned to. In another implementation form, the group shapers, also called shaper buckets, 105a, 105b and 105c as depicted in FIG. 1 are implemented by the group shapers 401a, 401b and 401c of the rate limiting unit 400.

The rate limiting unit 400 further comprises a set of bit adders 403a, 403b, 403c for performing bit additions on the inputs, where each bit adder is assigned to a specific queue group according to the assignment of the buckets 401a, 401b and 401c. The bit adders 403a, 403b, 403c are configured to add outputs 404a, 404b, 404c of the bucket modules 401a, 401b, 401c assigned to a respective queue group to requests

TABLE 1

| possible variations of X and Y for each number. | | | | | | | | | | | | | | | | | |
|---|---|---|---|---|---|---|---|---|---|---|---|---|---|---|---|---|---|
| 0 | | 1 | | 2 | | 3 | | 4 | | 5 | | 6 | | 7 | | 8 | |
| X | Y | X | Y | X | Y | X | Y | X | Y | X | Y | X | Y | X | Y | X | Y |
| 0 | 0 | 1 | 0 | 2 | 0 | 3 | 0 | 4 | 0 | 5 | 0 | 6 | 0 | 7 | 0 | 8 | 0 |
|   |   |   |   |   |   |   |   | 0 | 4 | 1 | 4 | 2 | 4 | 3 | 4 | 4 | 4 |

102 assigned to the corresponding queue group. Outputs 406a, 406b, 406c of the bit adders 403a, 403b, 403c form the set of new requests 106.

In the implementation form depicted in FIG. 6 a number of three different queue groups are used: A first one "TE" processed by a TE path 408a, a second one "Bld" processed by a Build path 408b and a third one "Sel" processed by a Select path 408c. Acknowledgements of the set of acknowledgements 212 assigned to the "TE" queue group are stored in the first bucket 401a and processed by the first bit adder 403a for adding "TE" path bits of the output 404a of the "TE" bucket 401a to corresponding bits of the request vector 202 assigned to the "TE" queue group. Acknowledgements of the set of acknowledgements 212 assigned to the "Bld" queue group are stored in the second bucket 401b and processed by the second bit adder 403b for adding "Bld" path bits of the output 404b of the "Bld" bucket 401b to corresponding bits of the request vector 202 assigned to the "Bld" queue group. Acknowledgements of the set of acknowledgements 212 assigned to the "Sel" queue group are stored in the third bucket 401c and processed by the third bit adder 403c for adding "Sel" path bits of the output 404c of the "Sel" bucket 401c to corresponding bits of the request vector 202 assigned to the "Sel" queue group. A combination of the added bits added by the three bit adders 403a, 403b, 403c of the TE path 408a, the Build path 408b and the Select path 408c forms the rate-limited set of requests 206.

In an implementation form, the Rate Control Shaper, i.e. the rate limiting unit 400 is constructed from 3 shaper buckets 401a, 401b and 401c, one for each group of queues, and a mask register that masks the non-idle queues that are not eligible. The rate control shaper 400 manages the shaper buckets 401a, 401b, 401c according to the acknowledgement vector "ack_vec" 212 it receives. Each clock the acknowledgement vector 212 of each group that are received from the lookup vector prepare unit 203 (these that are not masked) are summed using a bit_adder 403a, 403b, 403c and decreased from the group's bucket 401a, 401b, 401c. On each clock a configurable amount denoted as "group_quantom" is added to the group bucket 401a, 401b, 401c. When the bucket size is zero or less, the group is masked from the eligibility vector. When the group bucket is larger than a configurable amount denoted as "group_max_quantom" the group bucket is assigned to group_max_quantom.

In the implementation form, gate-tree computation in a prefix forest unit of an input/output selector uses the following function, the Prefix Tree that yields P results implements the following function on the input vector v(i):

$$f_z(i : i \in \mathbb{N}) = f_x(i) + f_y(i)$$

$$= \begin{cases} \sum_{j=0}^{i} v(i), & \sum_{j=0}^{i} v(i) < P \\ P, & \sum_{j=0}^{i} v(i) \geq P \end{cases}$$

The computed values are $f_x(i)$ and $f_y(i)$ so that the required result is achieved by combining the different possible results of both according to the prefix tree theorem. The output of the prefix tree process is constructed from two sets of 2*N numbers (log N bits each) that represent the function result to the input vector. For each set of numbers (x,y), the result of the prefix tree process is the addition x+y. The delay complexity of the prefix tree process is O(lgn). Since Y holds only the two MSBs the possible combinations of X and Y which are relevant are much smaller.

Figure 7:
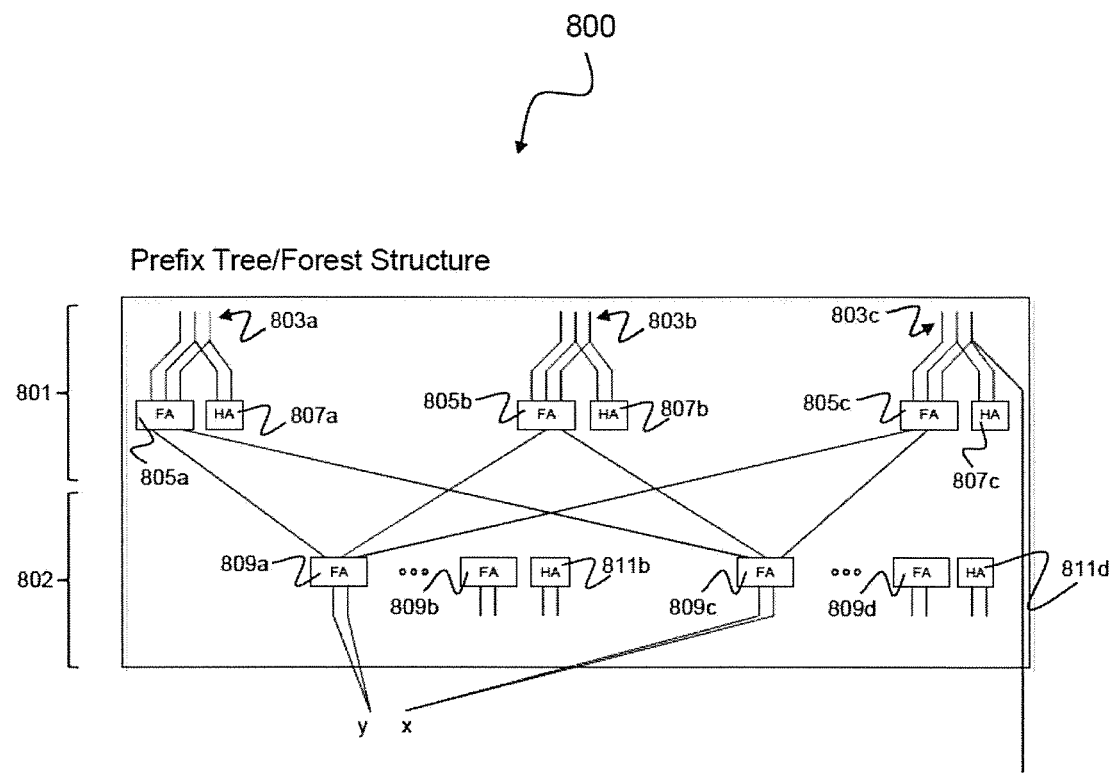
FIG. 7 shows a schematic diagram of prefix tree implemented in a prefix forest unit of an input/output selector according to an implementation form.

FIG. 7 shows a schematic diagram of prefix tree 800 implemented in a prefix forest unit of an input/output selector according to an implementation form. The prefix forest unit may correspond to a prefix forest unit 205 as described with respect to FIG. 4 or to a prefix forest unit 305 as described with respect to FIG. 5.

The prefix tree 800 comprises a first level 801 and a second level 802. The first level 801 receives three input vectors 803a, 803b, 803c, each one partitioned between first arithmetic units "FA" 805a, 805b, 805c and second arithmetic units 807a, 807b, 807c and provides outputs to the second level 802. The second level 802 comprises first arithmetic units "FA" 809a, 809b, 809c, 809d and second arithmetic units " " 811b, 811d. The interconnection between the first arithmetic units "FA" of the first level 801 and the first arithmetic units "FA" of the second level 802 form the outputs x and y such that the prefix tree 800 yields P results implementing the following function on the input vector v(i) 803a, 803b, 803c:

$$f_z(i : i \in \mathbb{N}) = f_x(i) + f_y(i).$$

For determining the performance of an input/output selector implementing a prefix tree 800, the following issues have to be considered. In the design there is one clear longest path that requires addressing. This longest path starts at the lookup vector prepare unit (LVP) 203 described with respect to FIGS. 4 and 5. It goes through the Gate Tree 307 as depicted in FIG. 5, passes the Compare 311a, 311b, 311c units and the Mask generator 313 depicted in FIG. 5 and returns back to the LVP 203 depicted in FIG. 5.

Performing an estimated analysis of the propagation delay for an input vector of size N results in the following delay times for each phase. The LVP output is registered so it is considered zero gates resulting in a zero delay time. The gate tree is constructed from FA and HA arithmetic units. These are actually constructed from two simple gates which leads to an estimated delay of 2*LgN gates. However, standard libraries have complex gates that can perform these standard functions in one complex gate, thereby resulting in a delay time of LgN. The compare phase is constructed from several compares done in parallel, thereby resulting in a delay time of 4 gates. The return back to the LVP has another gate and sample, thereby resulting in a delay time of 1 gate. In summary, the delay time adds to the following value:

GateTree$_{PD}$+Compare$_{PD}$+MaskGen$_{PD}$+Mask$_{PD}$+MuxShift$_{PD}$=LgN+1+3+1+1=Lg(2*N)+6

A worst case propagation delay estimation is summed in the following Table 2:

TABLE 2 a calculation for a worst case propagation delay through a prefix tree according to an implementation form.

| Number Of Queues (N) | 16 | 32 | 64 | 128 | 256 |
|---|---|---|---|---|---|
| Propagation Delay Estimation | 5 + 6 = 11 Gates (16 atomic) | 6 + 6 = 12 Gates (18 atomic) | 7 + 6 = 13 Gates (20 atomic) | 8 + 6 = 14 Gates (22 atomic) | 9 + 6 = 15 Gates (24 atomic) |

Figure 9:
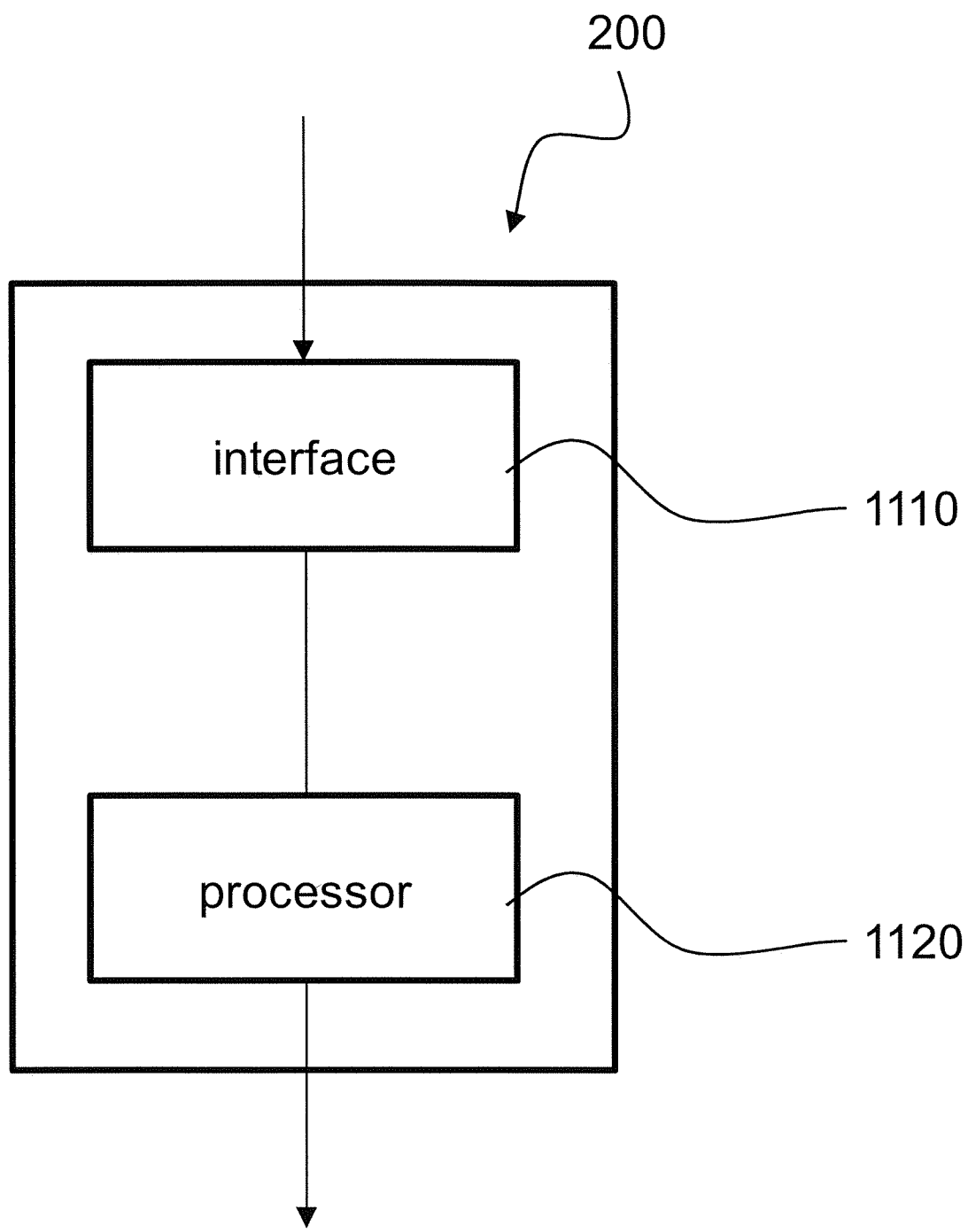
FIG. 9 shows a block diagram of a scheduling device according to another implementation form.

In another implementation form, the scheduling device 200 comprises an interface 1110 and a processor 1120 as depicted in FIG. 9. The interface 1110 is adapted for receiving the set of requests 202, and outputting the set of grants 204 and the selection mask 210. One or more units of the previous embodiments according to FIG. 4 to FIG. 6 are in a form of the processor 1120, the processor 1120 performs the corresponding steps of the units in order to provide the functionalities thereof.

Figure 8:
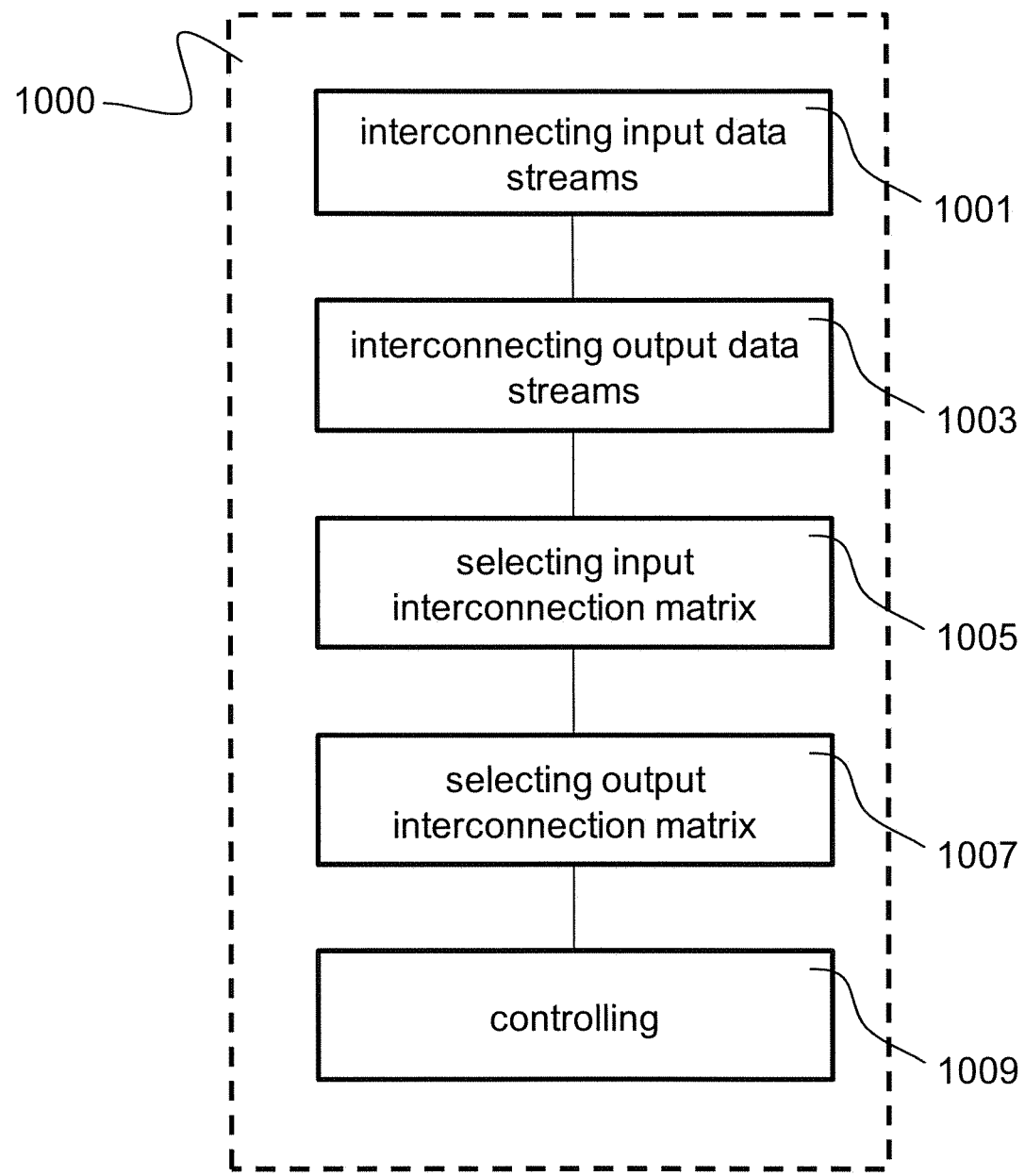
FIG. 8 shows a schematic diagram of a method for storing multiple inputs in a set of FIFO memories and for retrieving multiple outputs from the set of FIFO memories according to an implementation form.

FIG. 8 shows a schematic diagram of a method 1000 for storing multiple inputs in a set of FIFO memories and for retrieving multiple outputs from the set of FIFO memories according to an implementation form.

The method 1000 is for storing a set of input data streams 902 in a set of FIFO memories 901a, 901b, . . . , 901c and retrieving data from the set of FIFO memories 901a, 901b, . . . , 901c to a set of output data streams 904. Both the set of input data streams 902 and the set of output data streams 904 are operable to perform one of sending and stop sending new data in each clock cycle. The method 1000 comprises interconnecting 1001 each one of the set of input data streams 902 to each input of the set of FIFO memories 901a, 901b, . . . , 901c according to an input interconnection matrix. The method 1000 comprises interconnecting 1003 each output of the set of FIFO memories 901a, 901b, . . . , 901c to each one of the set of output data streams 904 according to an output interconnection matrix. The method 1000 comprises selecting 1005 the input interconnection matrix according to an input data scheduling scheme. The method 1000 comprises selecting 1007 the output interconnection matrix according to an output data scheduling scheme. The method 1000 comprises controlling 1009 the input data scheduling scheme such that data from the set of input data streams 902 is spread among the set of FIFO memories 901a, 901b, . . . , 901c in a round-robin manner and controlling the output data scheduling scheme such that data from the set of FIFO memories 901a, 901b, . . . , 901c is retrieved to the set of output data streams 904 in a round-robin manner.

In the above implementation forms, a set of three FIFO memories 901a, 901b, 901c is taken just as an example, the invention can apply to a set of any number of FIFO memories, such as eight shown in FIG. 1.

What is claimed is:

1. A memory aggregation device for storing a set of input data streams and retrieving data to a set of output data streams, both the set of input data streams and the set of output data streams being operable to perform one of sending and stop sending new data in each clock cycle, the memory aggregation device comprising:
a set of first-in first-out (FIFO) memories each comprising an input and an output;
an input interconnector configured to interconnect each one of the set of input data streams to each input of the set of FIFO memories according to an input interconnection matrix;
an output interconnector configured to interconnect each output of the set of FIFO memories to each one of the set of output data streams according to an output interconnection matrix;
an input selector configured to select the input interconnection matrix according to an input data scheduling scheme;
an output selector configured to select the output interconnection matrix according to an output data scheduling scheme; and
a memory controller coupled to both, the input selector and the output selector, wherein the memory controller is configured to control the input data scheduling scheme such that data from the set of input data streams is spread among the set of FIFO memories in a round-robin manner and to control the output data scheduling scheme such that data from the set of FIFO memories is retrieved to the set of output data streams in a round-robin manner;
wherein the input selector s further configured to receive a set of requests, limit a rate of the set of requests to provide a rate-limited set of requests, provide a lookup vector prepared set of requests based on the rate-limited set of requests and a selection mask, and provide a set of first grants based on the lookup vector prepared set of requests, wherein the selection mask is provided based on a set of second grants.

2. The memory aggregation device of claim 1, wherein a number of the FIFO memories corresponds to a number of the input data streams.

3. The memory aggregation device of claim 1, wherein:
the input interconnector comprises a set of multiplexers for implementing the input interconnection matrix; and
the output interconnector comprises a set of multiplexers for implementing the output interconnection matrix.

4. The memory aggregation device of claim 3, wherein:
the input selector comprises a gate-tree-arbiter logic configured for controlling the set of multiplexers of the input interconnector; and
the output selector comprises a gate-tree-arbiter logic configured for controlling the set of multiplexers of the output interconnector.

5. The memory aggregation device of claim 1, wherein the input selector is configured to select the input interconnection matrix such that only data streams of the set of input data streams having valid data requests are interconnected to the set of FIFO memories.

6. A memory aggregation device for storing a set of input data streams and retrieving data to a set of output data streams, both the set of input data streams and the set of output data streams being operable to perform one of sending and stop sending new data in each clock cycle, the memory aggregation device comprising:
a set of first-in first-out (FIFO) memories each comprising an input and an output;
an input interconnector configured to interconnect each one of the set of input data streams to each input of the set of FIFO memories according to an input interconnection matrix;
an output interconnector configured to interconnect each output of the set of FIFO memories to each one of the set of output data streams according to an output interconnection matrix;
an input selector configured to select the input interconnection matrix such that data streams of the set of input data streams having valid data requests are compressed to a continuous set of data requests in the set of FIFO memories;
an output selector configured to select the output interconnection matrix according to an output data scheduling scheme; and
a memory controller coupled to both, the input selector and the output selector;
wherein the input selector is further configured to receive a set of requests, limit a rate of the set of requests to provide a rate-limited set of requests, provide a lookup vector prepared set of requests based on the rate-limited set of requests and a selection mask, and provide a set of first grants based on the lookup vector prepared set of requests, wherein the selection mask is provided based on a set of second grants.

7. The memory aggregation device of claim 6, wherein the input selector is configured to select the input interconnection matrix such that the data streams of the set of input data streams having valid data requests are aligned with a FIFO pointer pointing to a vacant entry in the set of FIFO memories.

8. The memory aggregation device of claim 6, comprising:
   a clock input for receiving a clock signal, wherein the input selector is configured to switch the input interconnection matrix in each clock cycle of the clock signal; and
   wherein the output selector is configured to switch the output interconnection matrix in each clock cycle of the clock signal.

9. The memory aggregation device of claim 8, wherein the input selector is configured to receive an R-bit vector indicating a number of data streams of the set of input data streams having valid data requests and configured to select the input interconnection matrix such that in each clock cycle of the clock signal the first G data requests of the data streams of the set of input data streams are interconnected to the set of FIFO memories, wherein R and G are integer numbers.

10. The memory aggregation device of claim 8, wherein the output selector is configured to receive an R-bit vector indicating a number of data streams of the set of output data streams having valid data requests and configured to select the output interconnection matrix such that in each clock cycle of the clock signal the first G data requests of the data streams of the set of output data streams are interconnected to the set of FIFO memories, wherein R and G are integer numbers.

11. The memory aggregation device of claim 9, wherein the memory controller is configured to control R and G depending on a number of vacant entries in the set of FIFO memories.

12. A method for storing a set of input data streams in a set of first-in first-out (FIFO) memories and retrieving data from the set of FIFO memories to a set of output data streams, both the set of input data streams and the set of output data streams being operable to perform one of sending and stop sending new data in each clock cycle, the method comprising:
   interconnecting each one of the set of input data streams to each input of the set of FIFO memories according to an input interconnection matrix;
   interconnecting each output of the set of FIFO memories to each one of the set of output data streams according to an output interconnection matrix;
   selecting the input interconnection matrix according to an input data scheduling scheme;
   selecting the output interconnection matrix according to an output data scheduling scheme;
   controlling the input data scheduling scheme such that data from the set of input data streams is spread among the set of FIFO memories in a round-robin manner and controlling the output data scheduling scheme such that data from the set of FIFO memories is retrieved to the set of output data streams in a round-robin manner;
   receiving a set of requests;
   limiting a rate of the set of requests to provide a rate-limited set of requests;
   providing a lookup vector prepared set of requests based on the rate-limited set of requests and a selection mask; and
   providing a set of first grants based on the lookup vector prepared set of requests, wherein the selection mask is provided based on a set of second grants.

13. The method of claim 12, wherein:
   selecting the input interconnection matrix is based on a gate-tree-arbiter logic; and
   selecting the output interconnection matrix is based on a gate-tree-arbiter logic.

* * * * *